United States Patent [19]

Benjamin et al.

[11] 4,322,990
[45] Apr. 6, 1982

[54] DEVICE FOR SETTING END WORKING TOOLS OF MULTIPLE SPINDLE AUTOMATIC BAR MACHINES

[75] Inventors: Milton L. Benjamin; Wilbur N. Miles; Samuel Ecker, all of Chagrin Falls, Ohio

[73] Assignee: Erikson Tool Company, Solon, Ohio

[21] Appl. No.: 128,909

[22] Filed: Mar. 10, 1980

[51] Int. Cl.³ .................. B23B 25/06; B27G 23/00
[52] U.S. Cl. ................................ 82/3; 29/57; 33/185 R; 82/34 A; 409/218
[58] Field of Search .............. 29/57, 38 A, 38 B; 82/34 A, 34 D, 3; 408/35; 409/218; 33/185 R

[56] References Cited

U.S. PATENT DOCUMENTS

| | | | |
|---|---|---|---|
| 1,945,663 | 2/1934 | Smith et al. | 82/3 |
| 3,065,529 | 11/1962 | Hansen | 72/362 |
| 3,214,822 | 11/1965 | Paulick, Jr. | 29/57 |
| 3,380,326 | 4/1968 | Waddy | 33/185 R |
| 3,580,129 | 5/1971 | Austin et al. | 408/35 |
| 4,240,207 | 12/1980 | Benjamin et al. | 33/185 R |

OTHER PUBLICATIONS

*American Machinist*, Jun. 1926, p. 814, Francis C. Henry, "Plate for Setting Drills".

Primary Examiner—Z. R. Bilinsky
Attorney, Agent, or Firm—Maky, Renner, Otto & Boisselle

[57] ABSTRACT

A device in the form of a split clamp star wheel adapted to be clamped on the spindle carrier extension of a multiple spindle automatic bar machine in a predetermined axial location with respect to the spindle drum face and having at the points of the radiating arms thereof laterally pre-adjusted screws coaxially aligned with the axes of the respective spindles, the holders for the end cutting tools being longitudinally adjustably clamped in the respective end cutting tool slides (or auxiliary slides thereon) when the ends of the respective tools are engaged with the ends of the laterally pre-adjusted screws.

2 Claims, 2 Drawing Figures

DEVICE FOR SETTING END WORKING TOOLS OF MULTIPLE SPINDLE AUTOMATIC BAR MACHINES

BACKGROUND OF THE INVENTION

Multiple spindle automatic bar machines generally employ collet chucks for holding end working tools such as drills, spot drills, center drills, counterbores, spot facers, combination drills and countersinks, reamers, end mills and hollow mills, the integral shanks of the chucks being longitudinally adjustably clamped in the end working tool slides (or auxiliary slides thereon) which are moved toward and away from the spindle carrier. The use of end working tool chucks of the character indicated adds substantially to set-up time in that it entails individual measurement and longitudinal adjustment of the tools in the respective chucks or of the tool holders in the end working tool slides to achieve predetermined dimensions of the ends of the tools with respect to the spindle drum face of the machine in the closed position of the end cutting tool slide or slides.

SUMMARY OF THE INVENTION

The device herein is in the form of a split clamp which is adapted to be quickly and accurately positioned on the spindle carrier extension of a multiple spindle automatic bar machine and the like to position laterally pre-adjusted members coaxially of the respective spindles with their ends spaced predetermined distances from the spindle drum face whereby the holders for the respective end cutting tools may be quickly and accurately adjusted and clamped in the respective end working tool slides (or auxiliary slides thereon) when the ends of the end cutting tools are in abutting engagement with the ends of the respective pre-adjusted members.

Other objects and advantages will appear from the ensuing description.

DETAILED DESCRIPTION OF A PREFERRED EMBODIMENT

Figure 1:
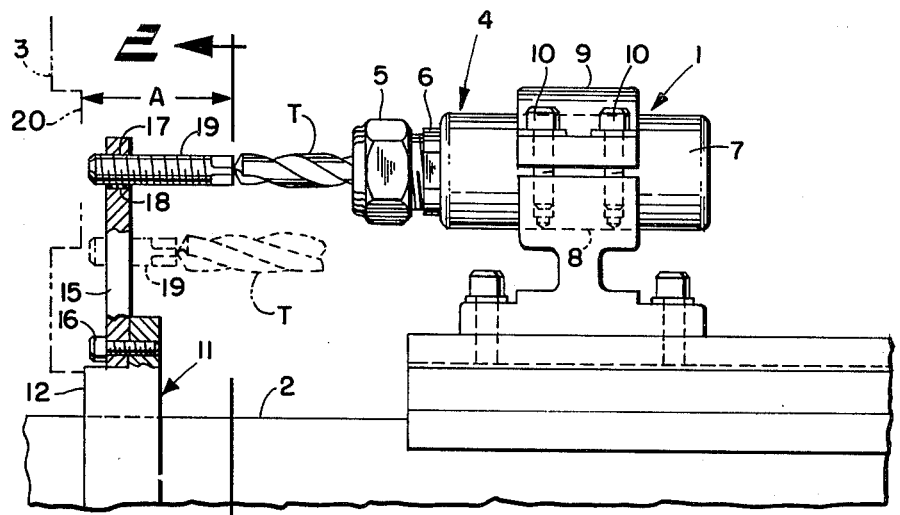
FIG. 1 is a radial cross-section view of a device embodying the present invention showing the holder for an end working tool in longitudinally adjusted position for clamping in the end working tool slide with the end of the tool disposed a predetermined distance from the spindle drum face.
Figure 2:
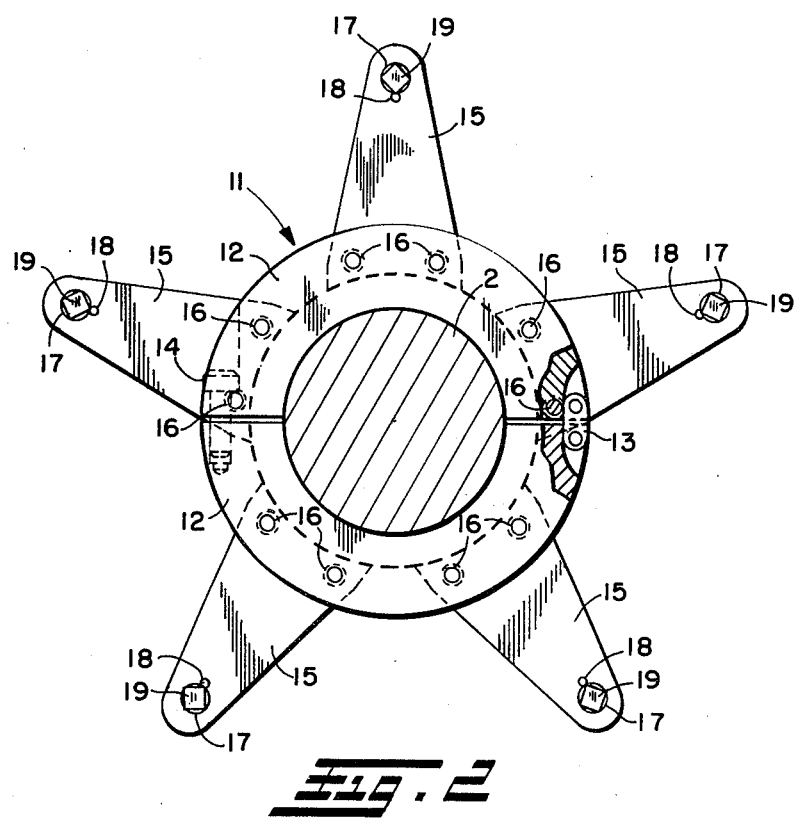
FIG. 2 is a cross-section view taken substantially along the line 2—2 of FIG. 1.

The reference numeral 1 denotes an end working tool slide of a multiple spindle automatic bar machine, chucker or the like which, by way of example only, is shown as a 5-spindle machine, it being understood that the machine may have a different number of spindles such as four, six or eight. See for example pages 594 to 597 of Tool Engineers Handbook (McGraw-Hill Book Company, Inc., 1949). The end working tool slide 1, also referred to as the "main tool slide", is mounted and slides longitudinally on an extension 2 of the spindle carrier 3 to provide accurate alignment of the slide 1 with the respective spindles. The end tool slide 1 is advanced and retracted by means well known in the art. It is to be understood that the machine may be provided with independent slides 1 for each end working position controlled by separate cams for each slide, thereby permitting a better selection of feeds for each end working tool.

Herein the end cutting tool T, for example a drill, is gripped in a chuck or holder 4 which, for example, may be a collet chuck of the type disclosed in Milton L. Benjamin U.S. Pat. No. 3,727,928 granted Apr. 17, 1973, in which the tightening of the nosepiece 5 on the holder body 6 effects contraction of a collet (not shown) into gripping engagement with the shank of the tool T. If desired, a lefthand threaded stop screw (not shown) in the body 6 may be engaged with the shank end of the tool T to prevent axial and rotary slipping thereof. The body 6 has a cylindrical shank 7 which is longitudinally adjustable in the bore 8 of the split clamp 9 and is securely clamped by tightening the screws 10 of the clamp 9.

The device 11 herein is preferably in the form of a star wheel comprising a diametrically split hub to define semicircular clamp arms 12 which at one end are pivotally connected to a link 13 and which are drawn together at the other end into clamping engagement with the extension 2 of the spindle carrier 3 by means of the screw 14. The points of the star wheel are formed by radial arms 15 which are secured to the clamp arms 12 by screws 16. The radially outer portions of the arms 15 have threaded openings 17 which are coaxial with the respective spindles of the spindle carrier 3 and end working tools T and which have nylon or like inserts 18 to make frictional engagement with the threads of the respective screws 19 which are preadjusted to set the different dimensions A from the spindle drum face 20 as called for by the set-up chart for the part to be made on the machine. Such pre-adjustment of the screws 19 may be effected as by supporting the device 11 on a flat horizontal plate corresponding to surface 20 and using a height gauge to set the locations of the respective screws 19. If desired, the surface on which the star wheel device 11 is supported may have a boss of diameter equal to the diameter of the extension 2 to prevent tilting of the device 11 on the supporting surface as the screws 19 are adjusted and to permit rotary indexing of the device 11 to successively position the screws 19 for height adjustment.

The device 11 herein may be pre-set as above indicated whereby it is a simple matter to open the clamp arms 12 to position the device 11 over the extension 2 and against surface 20 and to insert and tighten the screw 14 when the device 11 is angularly oriented to the position shown in FIG. 1 whereat the axes of the screws 19 coincide with the axes of the spindles and tools T. The holders 4 with the selected tools T then may be longitudinally adjusted in the bores 8 of clamps 9 of the respective end cutting slides 1 until the ends of the tools T abut the ends of the respective preadjusted screws 19, whereupon the clamping screws 10 may be tightened. In lieu of longitudinally adjusting the tool holder shanks 7 in the tool slide clamps 9, it is of course possible to loosen the nosepieces 5 and to longitudinally adjust the tools T to abut the ends of the respective screws 19, followed by retightening of the nosepieces 5. However, generally the end cutting tools T are adjusted to project specified distances from the nosepieces 5 so that final adjustment is made expeditiously by longitudinal adjustment of the holder shanks 7 in the tool slide 1. After adjustment of the tools T, the device 11 is detached from the extension 2.

As a typical example, a bushing blank may be made on a 5-spindle automatic as follows:

Spindle #1–Center drill and countersink and face end of bar
Spindle #2–Drill part way and rough form O.D.
Spindle #3–Additional drill depth
Spindle #4–Additional drill depth to final depth beyond length of blank and finish form O.D.
Spindle #5–Ream drilled hole and cutoff blank An auxiliary slide will be provided for the ream operation at Spindle #5 in view of the long stroke and much greater feed which may be several times that of the drilling operations at Spindles #2, #3, and #4. Also, the reamer may be held in a floating holder (not shown) as well known in the art.

The embodiments of the invention in which an exclusive property or privilege is claimed are defined as follows:

1. In a multiple spindle automatic machine having a spindle drum face, a spindle carrier extension, and an end cutting tool slide in which end cutting tools are axially adjustable to predetermined distances from said spindle drum face, the combination therewith of a device for facilitating such adjustment of said end cutting tools; said device comprising a split-clamp star wheel detachably clamped in a predetermined axial and angularly oriented position on said spindle carrier extension with a locating face thereof coinciding with said spindle drum face and with threaded holes at the points thereof coaxially aligned with the axes of the respective spindles and end cutting tools; and axially pre-adjusted screws in said holes extending axially toward the respective end cutting tools and having end surfaces spaced such predetermined distances from said coinciding locating and spindle drum faces for axial adjustment of said end cutting tools into abutting engagement with the respective end surfaces of said screws; said device, upon adjustment of said end cutting tools as aforesaid, being detached from said spindle carrier extension.

2. The machine of claim 1 wherein said split-clamp star wheel has a diametrically split hub defining said locating face and defining semi-circular clamp arms which at one end are hinged together for positioning of said star wheel over said spindle carrier extension and which at the other end are provided with means for drawing said arms together to clamp said star wheel around said spindle carrier extension in such predetermined axial and angularly oriented position.

* * * * *